United States Patent Office 2,950,313
Patented Aug. 23, 1960

2,950,313

SURFACE ACTIVE POLYOXYPROPYLENE ESTERS

Willard H. Kirkpatrick, Sugar Land, Tex., assignor to Visco Products Company, Houston, Tex., a corporation of Delaware No Drawing. Filed July 2, 1957, Ser. No. 669,466

16 Claims. (Cl. 260—484)

This invention relates to new and improved surface active compositions and more particularly surface active compositions which are effective in breaking water-in-oil petroleum emulsions.

Petroleum emulsions are in general of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B.S."

One type of process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

Another type of process involves the use of a demulsifying agent of the kind hereinafter described in acidizing operations on petroleum producing strata. In such an operation corrosion inhibited acid is forced down the well and into the formation under pressure. The acid attacks limestone formation enlarging the fissures and openings through which the oil fluids flow to the well pool, thus increasing the production. In many cases, particularly troublesome emulsions are encountered immediately after a well has been acidized. This condition can be minimized and many times eliminated by incorporating a suitable demulsifying composition with the acidizing medium.

Still another type of process involves the use of a demulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5% to 10% of fresh water is added to the crude oil charge stock and emulsified therein by means of a pump or through a differential pressure valve. A demulsifying agent is added and the treated oil permitted to stand in a quiescent state for relatively short periods of time allowing the salt-laden water to stratify, whereupon it is bled off to waste resulting in 90% to 98% removal of salt content. This operation is carried out continuously as contrasted with batch treating.

An object of the present invention is to provide a novel reagent which is water-wettable, interfacial and surface-active in order to enable its use as a demulsifier or for such uses where surface-active characteristics are necessary or desirable. Other objects will appear hereinafter.

The novel substances provided in accordance with the present invention consist of compositions of high molecular weight which are esters of polyoxyalkylene compounds having a terminal hydroxy group in which the major proportion of the molecular weight is attributable to oxypropylene groups (e.g., oxy 1,2-propylene), and the minimum molecular weight of said polyoxyalkylene compound is at least 1200 and preferably at least 2000. With the foregoing limitations the molecular weights of the compounds employed for the purpose of the invention are preferably within the range of 1500 to 7500.

It has been discovered that these compositions have unusual and unexpected properties for resolving water-in-oil emulsions into their component parts. One possible theory which may be postulated for the striking effectiveness of these compositions in resolving petroleum emulsions is a hydrophobe-hydrophile balance which has not been secured heretofore with compositions well known in this art.

Polyoxypropylene glycols are known and available in molecular weights up to 4000. However, the addition products resulting from the reaction of 1,2-propylene oxide with water are referred to in the literature but the properties are not described in a manner which would permit identification of the product. Monoethers of polyoxypropylene glycols have been described in U.S. Patent 2,448,664 and these compounds, unlike similar polyoxyethylene compounds are immiscible with water and are miscible with paraffinic hydrocarbons, the extent of miscibility being determined by temperature and nature of the ether grouping. The monoethers of polyoxypropylene glycol have unusual temperature-viscosity relationships in that while they retain adequate body at elevated temperatures they do not become unusually viscous at low temperatures. It is significant that these products having molecular weights of 2,000 to 3,000 are liquids whereas the corresponding polyoxyethylene compounds are solids.

The preferred compositions contemplated for use in accordance with this invention are exemplified by the following structural formula:

$$R'(OC_nH_{2n})_xR$$

wherein R' is an acyl radical and R is either hydroxy or an oxyacyl radical, with the further understanding that where R is an oxyacyl radical the terminal ester groups may be the same or different; $n$ is 3 and $x$ is equal to the number of times $n$ is 3, it being further understood that the molecular weight of said composition is at least 1200, preferably at least 2000.

Other illustrative compositions provided in accordance with the invention have the same general formula, where R', $n$, and $x$ have the same significance and R is oxyalkyl, oxyaralkyl, oxycycloalkyl, oxyaryl, secondary or tertiary aminoalkyl, secondary or tertiary aminoaralkyl or secondary or tertiary aminoaryl.

All of the compounds provided in accordance with the invention are characterized by the nucleus $$—(OC_nH_{2n})_x—$$

wherein $n$ has a value of 3, and a major proportion, preferably at least 60% by weight of the compound, is attributable to this nucleus.

As a further classification and specific illustration of compositions of the invention, there can be mentioned the monoesters of polyoxyalkylene diols, the diesters of polyoxyalkylene diols, the monoesters of polyoxyalkylene diol monoethers, the diesters of polyoxyalkylene diol monoethers derived by esterifying one mol of an organic dicarboxy acid with two mols of the diol monoether, the diesters of polyoxyalkylene diols obtained by esterifying one mol of the diol with two mols of an organic dicarboxy acid, and the monoesters of polyoxyalkylene diols obtained by esterifying one mol of the diol with one mol of an organic dicarboxy acid. The compositions can also consist of mixtures of said monoesters and diesters. It is to be understood that the acylating agent may be a monocarboxy or polycarboxy acid and in the case of esterifying using a polybasic acid one or more of the carboxyl groupings may exist as a free acid, and it may be further reacted to yield salts, esters, amides and the like. The substitution of hydrogen by halogen, nitro, hydroxyl, sulfonic and similar groupings in either the ether or acyl radical does not depart from the scope of this invention for simple substitution products of this nature have been found to be equally satisfactory for the purposes as outlined herein.

It is not intended that the foregoing lists each and every polyoxyalkylene ester composition that will satisfactorily resolve water-in-oil emulsions in accordance with this invention, for it will be obvious to those skilled in the art that certain mixed derivatives would function satisfactorily and in fact are contemplated by the present invention.

These demulsifying compounds employed in accordance with this invention may also be described as being surface-active and water-wettable and are nonionic in that they do not ionize to yield organic cations and organic anions, with the exception of those polybasic carboxy esters having a residual free carboxyl group, or other ionizable group.

The monoesters and diesters of polyoxyalkylene diols as well as the esters of polyoxyalkylene diol monoethers are prepared in accordance with recognized and established procedures for such synthesis. The most simple manner of preparing a monoester and diester is by reacting the diol with the required acid anhydride. For the purpose of this invention the presence of a small quantity of residual free acid is not harmful to the resulting demulsifier. In those instances where acid anhydrides are not readily available or if it is desired that the reaction product contain no free acid the diol or monoether may be reacted with the required acid in the presence of a solvent which lends itself to azeotropic distillation. The reaction is carried out in a suitable reaction vessel provided with facilities to recover any aqueous distillate which is distilled from the reaction mixture. The reaction mass is then heated at elevated temperatures until the theoretical amount of water has been secured to indicate simple esterification. Both symmetrical and unsymmetrical simple diesters can be prepared with this procedure and the resulting compositions are effective in demulsifying water-in-oil emulsions. Further, it has been noted that both simple mono- and diesters of polybasic acids, when one or more of the carboxyl groups remain unreacted, are particularly effective as demulsifiers.

Since as indicated above it is possible to prepare the compositions of this invention by various routes and from a number of different classes of starting materials the invention should not be limited by the following examples which are merely intended to illustrate some satisfactory procedures for preparing a few of the materials suitable for employment within the scope of the present invention.

EXAMPLE I

To 1200 parts of a polyoxypropylene glycol having a molecular weight of 1200 contained in a suitable reaction flask there is added 300 parts of oleic acid and 200 parts of a hydrocarbon diluent such as $SO_2$ extract. The reaction mixture is heated to 160° C. to 220° C. until an amount of water has distilled over equivalent to the theoretical amount indicated for monoesterification. If it is desired that the simple monoester be isolated in a substantially pure form, the hydrocarbon vehicle may be removed by heating at slightly elevated temperatures under vacuum.

The simple diester is prepared in a similar manner by using 600 parts of oleic acid instead of the 300 parts required for the preparation of the monoester.

EXAMPLE II

In a suitable reaction flask there is placed 1,000 parts of polyoxypropylene glycol having a molecular weight of 2,000, 74 parts of phthalic anhydride and 200 parts of a suitable hydrocarbon fraction such as $SO_2$ extract. The phthalic anhydride reacts at approximately 150° C. by opening of the anhydride linkage to form the monophthalate of the polyoxypropylene glycol. No water is removed in this reaction.

EXAMPLE III

The butyl ether of polyoxypropylene glycol having a molecular weight of 1200 is prepared by the reaction of butyl bromide with the alkali metal alcoholate of the polyoxypropylene glycol. Much work on this preparation has been done by Hibbert and his co-workers (see, e.g., Journal of American Chemical Society, volume 61, page 1905). The equation given below illustrates the reaction involved $$R_1X + Na(OC_3H_6)_xOH \rightarrow R_1(OC_3H_6)_xOH + NaX$$

where X represents a halogen atom and $R_1$ represents alkyl, alkenyl, aralkyl, aralkenyl, aryl or cycloalkyl.

To 653 parts of the monobutyl ether of a polyoxypropylene glycol, prepared as above, contained in a suitable reaction flask, there is added 150 parts of tallol (which is essentially an equal mixture of unsaturated acids and resin acids) and 300 parts of $SO_2$ extract. The reaction mixture is heated until an amount of aqueous distillate has been secured which is equivalent to the theoretical amount of water required for complete esterification. This requires a reaction time of approximately 4 hours and temperatures between 170° C. and 220° C. The finished product is the tallol ester of the butyl ether of the polyoxypropylene glycol.

EXAMPLE IV

To 400 parts of a polyoxypropylene glycol having a molecular weight of 2000 contained in a suitable reaction flask there is added 75 parts of phthalic anhydride. The reactants are heated with agitation for a period of 12 hours at a temperature of 230° C. to 240° C. No water is removed in this reaction. Somewhat elevated temperatures are required to secure esterification by opening of the anhydride linkage on account of the fact that at least a portion of the hydroxy groups present in the diol are secondary and not as reactive as primary hydroxy groups. In order to secure the finished product, 900 parts of a suitable hydrocarbon extract is added and agitated to secure uniform solution of the ester.

It will be observed that the compositions described in the foregoing examples all have a relatively high molecular weight attributable to oxypropylene groups. All of these compositions are simple or monomeric esters of an organic carboxy acid and a polyoxypropylene compound having an average molecule weight of at least 1200.

By way of illustrating the remarkable effectiveness of the products contemplated by this invention as compared with products obtained from low molecular weight polyoxypropylene glycols and other glycols such as high molecular weight polyoxyethylene glycols which are outside of the scope of the invention, the following preparations and comparative tests were made.

A series of compositions was prepared by mixing specific glycols with organic carboxy acids in a three-necked flask provided with a means of agitation, thermometer and an inlet tube extending below the surface of the reactants to permit carbon dioxide gas to be bubbled through the liquid during the course of the reaction.

The flask was also provided with an efficient condenser and a means of trapping any water which was formed during the course of the reaction. In this type of reaction where carbon dioxide is swept continuously through the reaction mixture it was inevitable that a portion of the water escaped without condensing. The reaction product was diluted with isopropanol and/or a suitable hydrocarbon fraction such as $SO_2$ extract so that the concentration of the active ingredient in the final product was approximately 67% by weight. Each composition was given a code designation. In each case equimolar proportions of an organic carboxy acid or acid anhydride and a glycol were used and the reaction mixture was heated. The reacting components and the final reaction temperature are give in the following table:

*Table I*

| Code No. | Organic Carboxy Acid | Glycol | Final Reaction Temperature, °C. |
|---|---|---|---|
| A | Phthalic Anhydride | Tripropylene Glycol | 210 |
| B | Maleic Anhydride | ......do...... | 196 |
| C | Diglycolic Acid | ......do...... | 194 |
| D | Phthalic Anhydride | Polyethylene Glycol 1500 | 198 |
| E | Maleic Anhydride | ......do...... | 196 |
| F | Diglycolic Acid | Polyoxypropylene Glycol 2000 | 195 |
| G | Maleic Anhydride | Polyoxypropylene Glycol 1200 | 200 |
| H | Diglycolic Acid | ......do...... | 198 |

In the preparation of the foregoing compositions listed in Table I, compositions A and B were made by reacting 1.5 mols each of the acid anhydride and the tripropylene glycol with the removal of an aqueous distillate. The theoretical quantity of water required to produce a complete polyester under the conditions used was 27 parts by weight (18×1.5) and the amount of water actually removed in A was 15 parts by weight and in B 21.5 parts by weight, so that the resultant compositions were predominantly polyesters rather than monomeric esters.

In preparing composition C 1½ mols of diglycolic acid were reacted with 1½ mols of tripropylene glycol and an aqueous distillate was removed. The amount of water collected was 45 parts by weight.

In the preparation of compositions E and G no signifiproportions of the phthalic anhydride and polyethylene glycol 1500 were heated at an average temperature of 198° C. for 43.25 hours with no water being eliminated.

In the prepartion of compositions E and G no significant amount of water was eliminated. In preparing composition E the reaction was carried on for about 5.5 hours at 196° C. and in preparing composition G the reaction was carried on for 6 hours and 10 minutes at 200° C.

In preparing compositions F and H one mol of water per mol of diglycolic acid was eliminated during the reaction in each case. The temperature used in preparing composition F started at 181° C. and went to 195° C. in a period of 6 hours. The temperature used in preparing composition H started at 184° C. and went to 198° C. in 6 hours and 45 minutes.

It should be understood that compositions A, B, C and D are described herein merely for the purpose of pointing out different types of compositions which are outside of the scope of the invention and comparing the effectiveness of such compositions with those such as E, F, G and H that are within the scope of the invention.

These compositions were tested on a water-in-oil petroleum emulsion containing 24% by volume of water. The tests were made by adding 0.07 cc. of a 10% by volume solution of each of the above identified compositions in equal parts by weight of isopropanol and $SO_2$ extract to 100 cc. samples of the aforesaid petroleum emulsion. Each test container was given 100 shakes at ordinary room temperature (approximately 70° F.). The water drop was observed at intervals of 2 minutes, 5 minutes, 15 minutes and 30 minutes. At the end of the 30 minute period an excess grindout was made in order to determine how much water still remained in the emulsion. The water remaining in the emulsion as shown by the excess grindout was considered to be a measure of the comparative effectiveness of the compositions tested. The results are shown in the following table:

*Table II*

| Additive | Water Remaining as Shown by Excess Grindout |
|---|---|
| Blank | 24.0 |
| A | 23.0 |
| B | 21.0 |
| C | 21.0 |
| D | 21.0 |
| E | 7.5 |
| F | 7.0 |
| G | 7.0 |
| H | 8.0 |

Similar tests were made on other water-in-oil petroleum emusions with generally similar comparative results. These tests showed that the compositions E, F, G and H, provided in accordance with the present invention, were far superior to the compositions A, B, C and D in breaking water-in-oil petroleum emulsions.

While the invention is not limited to any theory, it is believed that this superiority is due at least in part to the high oxypropylene content. Thus, when a polyoxypropylene glycol or a monoether of a polyoxypropylene glycol having a molecular weight of said 1500 to 3000 is reacted with an organic dicarboxy acid containing 2 to 8 carbon atoms in a molar ratio of 1:1 with the removal of one molecule of water, the primary reaction is a simple esterification and the resultant compositions contain a major proportion of their average molecular weight as oxypropylene groups. Although the mechanism of the reaction involved in breaking petroleum emulsions is not exactly known, the superiority of some compounds employed for this purpose as compared with others is believed to reside in the hydrophobe-hydrophile balance. In the compositions of the present invention this balance is maintained by having present a major proportion of oxypropylene groups. Too large a proportion of oxyethylene groups would destroy this hydrophobe-hydrophile balance as shown, for example, by composition D in the previously described tests. The addition of a large hydrophobic molecule to the terminal portion of the compound might also destroy the hydrophobe-hydrophile balance, if such addition causes the terminal portion of the molecule to outweigh the oxypropylene groups.

In the compositions described in the examples, either one or two mols of the organic carboxy acid is employed per mol of polyoxyalkylene compound.

The products described in these examples can be called simple esters. In any case, where an acid anhydride, such as maleic anhydride or phthalic anhydride is reacted in the proportion of one mol of such anhydride per mol of a monoether of a polyoxypropylene glycol, the resultant product is necessarily a simple monoester. If one mol of an acid such as diglycolic acid is reacted with one mol of a monoether of a polyoxypropylene glycol, the simple monoester is formed by the elimination of one molecule of water from the reaction mixture. If two mols of the monoether are reacted with one mol of a dicarboxy acid such as diglycolic acid, a simple diester is formed with the elimination of two molecules of water from the reaction mixture.

Since esterification reactions can proceed simultaneously, it is possible to form cogeneric mixtures of simple mono- and diesters. The resultant esters can contain one dicarboxy acid group linked to a single monoether of a polyoxypropylene glycol or to two monoether polyoxypropylene glycol groups. In either case, the resultant esters have a major proportion of their molecular weight attributable to oxypropylene groups.

Where a dicarboxy acid anhydride such as maleic anhydride or phthalic anhydride is reacted with a polyoxypropylene glycol having a molecular weight of say 2000 to 4000, only simple monoesters and diesters can be formed where no water is eliminated with the reaction mixture. Such mixtures can contain esters in which one mol of the polyoxypropylene glycol is reacted in such a way that each of the terminal hydroxyl groups is esterified with a mol of a dicarboxy acid and the composition also contains free carboxy groups. Thus, a composition provided in accordance with the invention made from two mols of maleic anhydride or phthalic anhydride and one mole of a polyoxypropylene glycol having a molecular weight of 1200 to 3000 without elimination of water should consist of compounds containing a central long chain polyoxypropylene nucleus and two terminal dicarboxy acid nuclei. The resultant compounds would, of course, contain two ester linkages but would have no repetition of the glycol unit and therefore are classed as simple esters. When this reaction is carried out with a free acid such as diglycolic acid and two mols of this acid are reacted with one mol of the glycol with the elimination of no more than two mols of water, the resultant products again consist primarily of simple esters and contain only a single long chain polyoxypropylene nucleus.

As a further illustration of the remarkable effectiveness of the products contemplated by the invention, the following test results are given.

Field bottle tests were made on samples of emulsified oil taken from the Cayuga Field in East Texas. A sample grindout showed that these emulsions contained about 70 parts of water per 100 parts of emulsion. The oil being treated in this field had a gravity of about 28° A.P.I. A gun barrel system was being used in the field and the oil was being treated at an approximate temperature of 160° C.

One hundred (100) cc. samples were taken and placed in conventional field test bottles. A test with another chemical which was being used to treat the oil commercially indicated that about 0.06 cc. of a 10% solution of the treating chemical was required per 100 cc. of sample. In testing the composition of the present invention the treatment employed was at the rate of 1 gallon of the treating chemical to 250 barrels of net oil, that is, oil after the removal of the water.

After the test chemical was added, the samples which were placed in the test bottles were shaken 200 times at atmospheric temperatures and subsequently agitated an additional 100 times at a temperature of 140° F. After shaking in each instance, the water drop was determined and recorded, that is to say, the amount of water which separated from the emulsion. The color and sheen or brilliance of the oil was also observed and recorded at the same time. After agitation at elevated temperatures, the samples were maintained at 160° F. to permit settling and stratification of the water.

The samples were secured just after the oil came from the well and every effort was made to maintain conditions comparable to those present in a full scale plant treatment. After agitating, the samples were allowed to settle and were tested for water drop at predetermined periods of time and were recorded on suitable test sheets.

The test showed that an ester composition prepared in accordance with this invention caused 69 of the 70 parts of water to separate before the bottles were given hot agitation. After settling 30 minutes at 160° F., substantially all of the water had separated indicating that the emulsion had been resolved satisfactorily.

Throughout the specification and claims the following definitions apply:

Alkyl—a monovalent radical derived from an aliphatic hydrocarbon by removal of one hydrogen atom, as, for example, methyl, ethyl, propyl, octyl, cetyl, myricyl and their homologues, preferably containing 1 to 30 carbon atoms;

Alkenyl—a monovalent radical derived from an unsaturated aliphatic hydrocarbon, as, for example, ethenyl (vinyl), allyl, undecenyl, octadecenyl, linolenyl, and their homologues, preferably containing 2 to 18 carbon atoms and having a single double bond;

Aralkyl—a monovalent radical derived from an aromatic substituted aliphatic hydrocarbon, as, for example, benzyl, phenylethyl, phenylpropyl, phenylbutyl, phenyloctyl, phenylcetyl, phenyloctadecyl and homologues, preferably containing 1 to 30 carbon atoms in the alkyl chain;

Cycloalkyl—a monovalent radical derived from a cycloaliphatic hydrocarbon, as, for example, cyclopentyl, cyclohexyl and cycloheptyl;

Aralkenyl—a monovalent radical derived from an aromatic substituted aliphatic hydrocarbon, as, for example, styryl, cinnamyl, and homologues;

Aryl—a monovalent radical derived from an aromatic hydrocarbon by removal of one hydrogen atom, as, for example, phenyl and naphthyl;

Acyl—a monovalent radical derived from an organic acid by removal of the hydroxy group, as, for example, formyl, acetyl, propionyl, butyryl octoyl, lauryoyl, stearoyl, trichloroacetyl, oleyl, ricinoleyl, benzoyl, phenylacetyl, naphthoyl, mono- and diadipoyl, mono- and diglutamoyl, mono- and disuccinoyl, toluene sulfonyl, naphthalene sulfonyl and acyl radicals derived from petroleum sulfonic acids;

Oxyalkyl—a monovalent radical derived from an aliphatic alcohol by removal of the hydrogen atom of an alcoholic hydroxyl, as, for example, methoxy, ethoxy, propyloxy, octyloxy, cetyloxy, myricyloxy, and homologues thereof, preferably containing 1 to 30 carbon atoms;

Oxyaralkyl—a monovalent radical derived from an aralkyl alcohol by removal of the hydrogen atom of an alcoholic hydroxyl, as, for example, —O—CH$_2$C$_6$H$_5$, —O—C$_2$H$_4$C$_6$H$_5$, oxypropylphenyl, oxybutylphenyl, oxyoctylphenyl, oxycetylphenyl, oxyoctadecylphenyl, and homologues thereof, preferably containing 1 to 30 carbon atoms in the alkyl chain;

Oxyaryl—a monovalent radical derived from a phenol by removal of the hydrogen of the phenolic hydroxy, as, for example, phenoxy, naphthoxy, and homologues thereof;

Oxycycloalkyl—a monovalent radical derived from a cycloaliphatic alcohol by removal of the hydrogen of the alcoholic hydroxy, as, for example, cyclopentyloxy, cyclohexyloxy, cycloheptyloxy, and homologues;

Oxyacyl—a monovalent radical having the structure

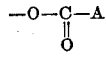

where

represents an acyl group, as, for example, the formic acid ester, acetic acid ester, ricinoleic acid ester, diglycolic acid esters, dilinoleic acid esters, phthalic acid esters, tallol esters, succinic acid esters, abietic acid ester, trimethylhexanoic acid ester, esters formed from alcoholysis products of caster oil, and homologues thereof preferably containing 1 to 36 carbon atoms;

Secondary aminoalkyl—a monovalent radical derived by the removal of hydrogen from a nitrogen atom of a primary alkyl amine, as, for example, methylamino, ethylamino, butylamino, and higher homologues;

Tertiary aminoalkyl—a monovalent radical derived by the removal of hydrogen from a nitrogen atom of a secondary alkyl amine, as, for example, dimethylamino, diethylamino, diisopropyl amino, dibutylamino and higher homologues;

Fatty acid—acetic acid and higher homologues together with the unsaturated acids such as oleic and ricinoleic derived from fats and fatty oils;

Resin acid—rosin and similar carbocyclic acids, preferably the oil soluble acids, e.g., rosin, cracked copals, etc.;

Halogen—one of the atoms chlorine, bromine, iodine or fluorine;

Halide—a salt containing a halogen atom as the anion.

The following specific compositions may be mentioned as illustrative of compositions provided in accordance with the invention:

(I) The esters obtained by the procedure of Example I by reacting the oleic acid with polyoxypropylene diols having molecular weights of 2000 and 3000, respectively.

(II) The esters obtained by the procedure of Example II by reacting the phthalic anhydride with polyoxypropylene diols having molecular weights of 1200 and 3000, respectively.

(III) The esters obtained by the procedure of Example III but substituting the chemically equivalent amounts of oleic, acetic, ricinoleic, diglycolic, phthalic, succinic, or abietic acids for the tallol acids.

The demulsifying compositions are preferably employed in the proportion of 1 part of reagent to from 2000 to 50,000 parts of emulsion either by adding the concentrated product direct to the emulsion or after diluting with a suitable vehicle in the customary manner.

The suitable hydrocarbon vehicle referred to in the examples is sulfur dioxide ($SO_2$) extract. This material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains which is designated in the trade as $SO_2$ extract. Examples of other suitable hydrocarbon vehicles are Gray Tower polymers, toluene, xylene, gas oil, diesel fuel, bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

The products prepared in accordance with the invention are very useful in breaking petroleum emulsions, especially those in which the oil is paraffinic or paraffinic-naphthenic, and have been successfully used in breaking water-in-oil petroleum emulsions in the Mid-Continent oil fields, including Oklahoma, Illinois, Kansas, the Gulf Coast, Louisiana, Southwest Texas and California.

This application is directed toward subject matter which was required to be divided from my copending application Serial No. 99,333 filed June 15, 1949. This application is a continuation-in-part of my copending application Serial No. 491,230 filed February 28, 1955, which in turn was a continuation-in-part of parent applications Serial Nos. 98,162 filed June 9, 1949, and 99,333 filed June 15, 1949, and the disclosures in said parent applications are incorporated herein by reference as fully and completely as if they had been set forth in their entireties. The aforesaid applications have been abandoned.

The invention is hereby claimed as follows:

1. A polyoxypropylene compound having a terminal hydroxy group which has been esterified with a carboxy acyl group, said polyoxypropylene compound having an average molecular weight of at least 1200, the major proportion of the average molecular weight of said ester being attributable to oxypropylene groups, said ester containing only one oxypropylene chain and having a molecular weight not exceeding 7500.

2. A compound as claimed in claim 1 in which at least 60% of the average molecular weight of said ester is attributable to oxypropylene groups.

3. An ester of an organic dicarboxy acid and a polyoxypropylene diol, said diol having an average molecular weight of at least 1200, said dicarboxy acid containing from 2 to 8 carbon atoms inclusive, the oxypropylene groups in said ester composing at least 60% by weight thereof, said ester containing only one oxypropylene chain and having a molecular weight not exceeding 7500.

4. An ester of an organic dicarboxy acid containing 2 to 8 carbon atoms inclusive and a monoether of a polyoxypropylene glycol having an average molecular weight of at least 1200, the oxypropylene groups in said ester composing at least 60% by weight thereof, said ester containing only one oxypropylene chain and having a molecular weight not exceeding 7500.

5. A compound having the following formula $$R'(OC_nH_{2n})_xOH$$

where $R'$ is an acyl radical of a monocarboxy organic acid containing 1 to 36 carbon atoms, $n$ is 3 and $x$ is a number sufficiently great that the nucleus —$(OC_nH_{2n})_x$— forms a major proportion of the molecular weight of said compound and the molecular weight of said compound is within the range of 1500 to 7500.

6. A compound having the following formula $$R'(OC_nH_{2n})_xR$$

where $R'$ is an acyl radical of a dicarboxy organic acid containing 2 to 8 carbon atoms, R is an oxyalkyl radical, $n$ is 3 and $x$ is a number sufficiently great that the nucleus —$(OC_nH_{2n})_x$— forms a major proportion of the molecular weight of said compound and the molecular weight of said compound is within the range of 1500 to 7500.

7. A compound having the following formula $$R'(OC_nH_{2n})_xR$$

where $R'$ is an acyl radical of an organic carboxy acid containing 1 to 36 carbon atoms, R is an oxyalkyl radical containing 1 to 30 carbon atoms, $n$ is 3 and $x$ is a number sufficiently great that the nucleus —$(OC_nH_{2n})_x$— forms a major proportion of the molecular weight of said compound and the molecular weight of said compound is within the range of 1500 to 7500.

8. A compound having the following formula $$R'(OC_nH_{2n})_xR$$

where $R'$ is an acyl radical of an organic carboxy acid containing 1 to 36 carbon atoms, R is an oxyacyl radical of an organic carboxy acid containing 1 to 36 carbon atoms, $n$ is 3 and $x$ is a number sufficiently great that the nucleus —$(OC_nH_{2n})_x$— forms a major proportion of the molecular weight of said compound and the molecular weight of said compound is within the range of 1500 to 7500.

9. A compound having the following formula $$R'(OC_nH_{2n})_xR$$

where $R'$ is an acyl radical of an organic dicarboxy acid containing 2 to 8 carbon atoms, R is an oxyacyl radical of an organic dicarboxy acid containing 2 to 8 carbon atoms, $n$ is 3 and $x$ is a number sufficiently great that the nucleus —$(OC_nH_{2n})_x$— forms a major proportion of the molecular weight of said compound and the molecular weight of said compound is within the range of 1500 to 7500.

10. An ester of an organic dicarboxy acid containing 2 to 8 carbon atoms inclusive and a polyoxyalkylene glycol monobutyl ether having an average molecular weight of at least 1200, the oxyalkylene groups in said glycol consisting solely of oxy-1,2-propylene groups, said oxy-1,2-propylene groups composing at least 60% by weight of said ester, the average molecular weight of said ester not exceeding about 7500, there being only one chain composed of oxy-1,2-propylene groups.

11. A compound having the following formula $$R'(OC_nH_{2n})_xR$$

where R' is an acyl radical of diglycolic acid, R is an oxyalkyl radical, $n$ is 3 and $x$ is a number sufficiently great that the nucleus —$(OC_nH_{2n})_x$— forms a major proportion of the molecular weight of said compound and the molecular weight of said compound is within the range of 1500 to 7500.

12. A compound having the following formula $$R'(OC_nH_{2n})_xR$$

where R' is an acyl radical of maleic acid, R is an oxyalkyl radical, $n$ is 3 and $x$ is a number sufficiently great that the nucleus —$(OC_nH_{2n})_x$— forms a major proportion of the molecular weight of said compound and the molecular weight of said compound is within the range of 1500 to 7500.

13. A compound having the following formula $$R'(OC_nH_{2n})_xOH$$

where R' is an acyl radical of diglycolic acid, $n$ is 3 and $x$ is a number sufficiently great that the nucleus —$(OC_nH_{2n})_x$— forms a major proportion of the molecular weight of said compound and the molecular weight of said compound is within the range of 1500 to 7500.

14. A compound having the following formula $$R'(OC_nH_{2n})_xOH$$

where R' is an acyl radical of maleic acid, $n$ is 3 and $x$ is a number sufficiently great that the nucleus $$—(OC_nH_{2n})_x—$$

forms a major proportion of the molecular weight of said compound and the molecular weight of said compound is within the range of 1500 to 7500.

15. A compound having the following formula $$R'(OC_nH_{2n})_xR$$

where R' is an acyl radical of diglycolic acid, R is an oxyacyl radical of diglycolic acid, $n$ is 3 and $x$ is a number sufficiently great that the nucleus —$(OC_nH_{2n})_x$— constitutes 1200 to 4000 of the molecular weight of said compound.

16. A compound having the following formula $$R'(OC_nH_{2n})_xR$$

where R' is an acyl radical of maleic acid, R is an oxyacyl radical of maleic acid, $n$ is 3, $x$ is a number such that the nucleus —$(OC_nH_{2n})_x$— constitutes 1200 to 4000 of the molecular weight of said compound.

References Cited in the file of this patent

UNITED STATES PATENTS 2,562,878    Blair _____ Aug. 7, 1951

OTHER REFERENCES

Webster: New International Dictionary, page 1911, 2nd ed. (1934).

Fieser et al.: Organic Chemistry, page 30 (1956).

UNITED STATES PATENT OFFICE
CERTIFICATION OF CORRECTION

Patent No. 2,950,313                                   August 23, 1960

Willard H. Kirkpatrick

It is hereby certified that error appears in the above numbered patent requiring correction and that the said Letters Patent should read as corrected below.

Column 1, lines 24 and 25, for "artifically" read -- artificially --; column 5, line 15, for "give" read -- given --; line 44, for "compositions E and G no signifi-" read -- composition D equal molecular --; column 6, line 34, for "said" read -- say --.

Signed and sealed this 23rd day of May 1961.

(SEAL)
Attest:

ERNEST W. SWIDER                                           DAVID L. LADD
Attesting Officer                                              Commissioner of Patents